US 6,738,147 B2

(12) United States Patent
Yafuso

(10) Patent No.: US 6,738,147 B2
(45) Date of Patent: May 18, 2004

(54) AUTOSTIGMATIC FAR FIELD SIMULATOR

(75) Inventor: Eiji Yafuso, Carlsbad, CA (US)

(73) Assignee: Trex Enterprises Corporation, San Diego, CA (US)

( * ) Notice: Subject to any disclaimer, the term of this patent is extended or adjusted under 35 U.S.C. 154(b) by 62 days.

(21) Appl. No.: 10/104,354

(22) Filed: Mar. 22, 2002

(65) Prior Publication Data

US 2003/0179380 A1 Sep. 25, 2003

(51) Int. Cl.$^7$ ................................................ G01B 9/02
(52) U.S. Cl. ........................................................ 356/508
(58) Field of Search ................................ 356/450, 508, 356/510, 512

(56) References Cited

U.S. PATENT DOCUMENTS 4,887,905 A * 12/1989 Lisson et al. ................ 356/508

* cited by examiner

*Primary Examiner*—Samuel A. Turner
*Assistant Examiner*—Patrick Connolly
(74) *Attorney, Agent, or Firm*—John R. Ross; John R. Ross, III

(57) ABSTRACT

A far-field simulator (FFS) which can be accurately calibrated and verified to sub-wavelength optical precision under any applicable test conditions is described. The FFS can be used over a tremendous range of ambient temperatures, and other conditions without detriment to its inherent accuracy. The accuracy is provided by means of interferometric self-reference capability rather than by complex, delicate, and/or extremely expensive metering structures. As such, the described approach provides a test instrument that is highly insensitive to packing, shipping, and other sources of system misalignment, and yet provides alignment accuracy to the extent practically achievable by comparable systems. These preferred embodiments include an FFS with an autostigmatic cube an objective mirror and interferometer optics for calibrating the FFS with precision. The autostigmatic cube provides an image plane and includes a beam splitter, a pinhole and an optic defining a reference sphere having, by reason of the beam splitter, two optical centers of curvature. A first optical center of curvature is located at, or approximately at the image plane and a second optical center of curvature is located at the pinhole. The objective mirror has (also by reason of the beam splitter) a first focus and a second focus. It is positionable in tilt, tip and piston such that the first focus is located at the first optical center of curvature (i.e., at the image plane) of the autostigmatic cube and the second focus is located at the cube's second center of curvature (i.e., the pinhole). An imaging microscope objective is provided which magnifies the image plane and relays it to a view plane where a CCD is located. The FFS is calibrated by adjusting the objective mirror to null out interference fringes at the image and view planes.

12 Claims, 2 Drawing Sheets

AUTOSTIGMATIC FAR FIELD SIMULATOR

The present invention relates to optical testing equipment and in particular to equipment for testing far field optical equipment such as laser communication transceivers, missile trackers, target acquisition systems and telescopes.

BACKGROUND OF THE INVENTION

Optical systems used for long distance acquisition, tracking, observation, or communication are widespread in both government and commercial applications. These systems include military target acquisition systems, missile trackers, telescopes, surveyors, generalized optical communication terminals, and others. These systems may be comprised of one aperture and a corresponding optical system, or multiple apertures and/or multiple optical systems, each working in transmit (Tx) or receive (Rx) or both transmit and receive. If a system has multiple apertures, it is generally necessary that all apertures be "boresighted" with respect to each other, meaning that they are optically aligned to point in precisely the same direction. The distances over which these systems operate are typically long enough that they can be optically characterized as having their targets located at infinity, a regime commonly referred to as the "far field". An example of such a system is an astronomical telescope, which images all stellar objects as though they were identically located at infinity, despite the fact that the actual distances may vary by orders of magnitude. In the far field these optical devices typically do not distinguish distance, but instead view all target objects as though they are at infinity. Prior to deployment it is sometimes impractical to test optical devices at the distances over which they are designed to operate. An alternative is to use a device known as a "far field simulator" (FFS). A FFS is an instrument that is placed in the proximity of the optical device under test and aligned such that the two systems are staring directly at one another. The FFS objective aperture should be large enough to encompass any and all of the apertures and subapertures of the optical device under test. The FFS then simulates the optical characteristics of targets in the far field, allowing performance measurements of all pertinent parameters of the device under test.

Often it is desirable to utilize the FFS under conditions characteristic of the field of deployment as well as those found in controlled laboratory conditions. Because optical systems may be deployed under extreme and diverse conditions, the FFS must be capable of operating over a large range of ambient temperatures, humidity, and other local conditions. As an example, an aircraft laser communication terminal may have to be performance verified under a tarmac test temperature range of from −20 to +120 degrees Fahrenheit. These extremities raise inherent difficulties in designing the FFS to maintain reliable calibration precision under all test circumstances. Designing a FFS that maintains calibration in field conditions as well as in the laboratory is not always practicable.

What is needed is an FFS that is capable of precise simulation under all applicable situations and with the capability of quick calibration and easy confirmation that the system is calibrated accurately.

SUMMARY OF THE INVENTION

The present invention provides a far field simulator with precision that can be directly quantified under any applicable test conditions. The FFS is easily adjusted such that rays emanating from a point focus traverse the FFS, reflect back upon themselves precisely retracing their paths, and are perfectly self-imaged back to the original point. Optical interference at the self-imaged point can be used to verify proper calibration of the FFS with great accuracy. The FFS may be used in the laboratory or in the field of operations for testing of optical equipment used at great distances. The nature of the system is such that the required optical elements remain relatively simple. Alignment tolerances for an FFS are extremely strict in order to guarantee that any optical errors measured are in the equipment under test and not in the FFS test apparatus. These alignment tolerances must be maintained in both inclement field and controlled laboratory environments. Preferred embodiments provide this precision without requiring a metering structure of sufficient stiffness and thermal compensation to guarantee alignment over a range of temperatures and other environment conditions common to these varied environments. These preferred embodiments include an FFS with an autostigmatic cube an objective mirror and interferometer optics for calibrating the FFS with precision. The autostigmatic cube provides an image plane and includes a beam splitter, a pinhole and an optic defining a reference sphere having, by reason of the beam splitter, two optical centers of curvature. A first optical center of curvature is located at, or approximately at the image plane and a second optical center of curvature is located at the pinhole. The objective mirror has (also by reason of the beam splitter) a first focus and a second focus. It is positionable in tilt, tip and piston such that the first focus is located at the first optical center of curvature (i.e., at the image plane) of the autostigmatic cube and the second focus is located at the cube's second center of curvature (i. e., the pinhole). An imaging microscope objective is provided which magnifies the image plane and relays it to a view plane where a CCD is located. The FFS is calibrated by adjusting the objective mirror to null out interference fringes at the image and view planes. The approach of the present invention provides a means to verify the FFS to a sub-wavelength level of precision so that it can be adjusted and calibrated at the time of test in any applicable test environment. This provides the user access to full knowledge of the FFS's optical characteristics under any conditions, such that they can be removed as variables in the test, allowing the tester to isolate the performance characteristics of the equipment under test.

DETAILED DESCRIPTION OF PREFERRED EMBODIMENTS

Figure 1:
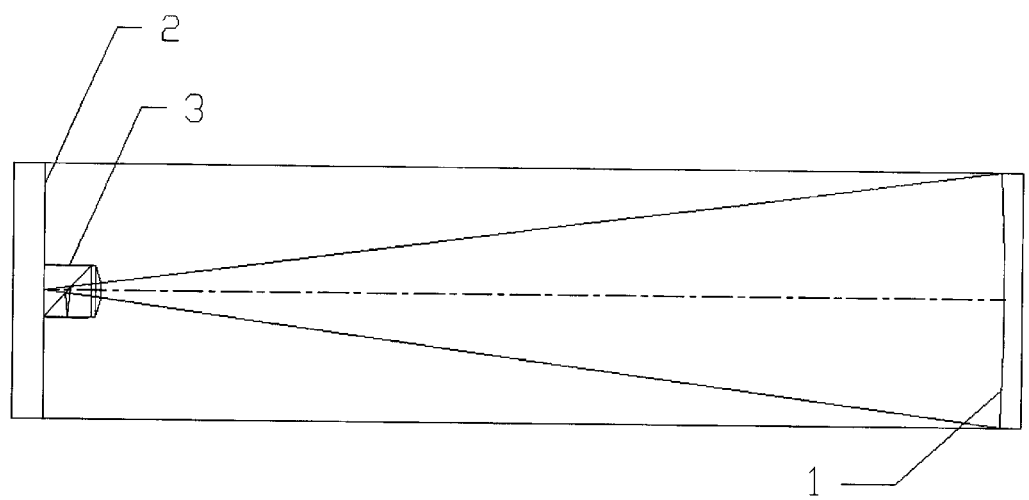
FIG. 1 is a drawing of a preferred embodiment of the present invention.
Figure 2:
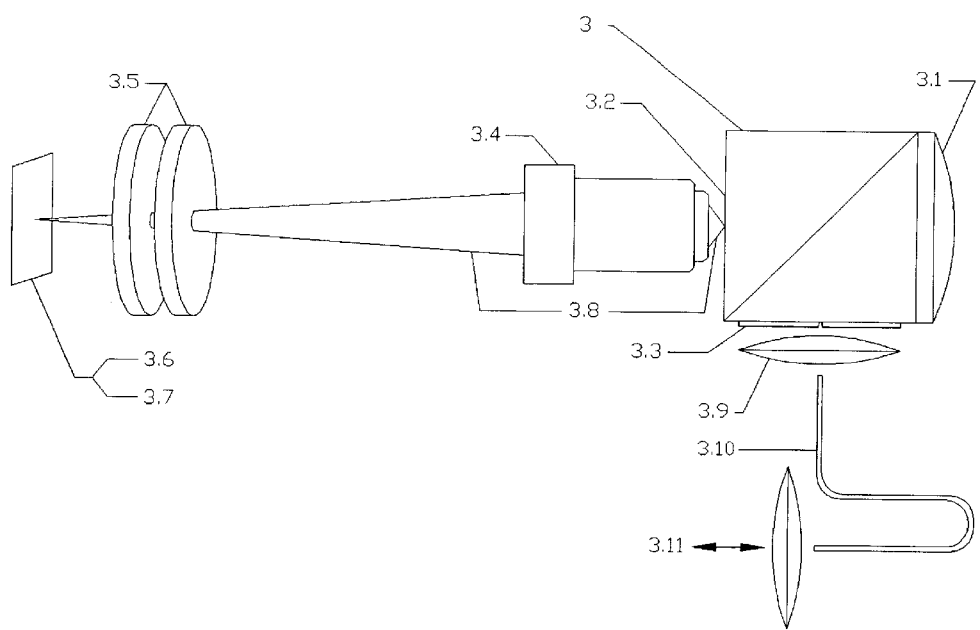
FIG. 2 shows optical elements of a preferred embodiment.
Figure 3:
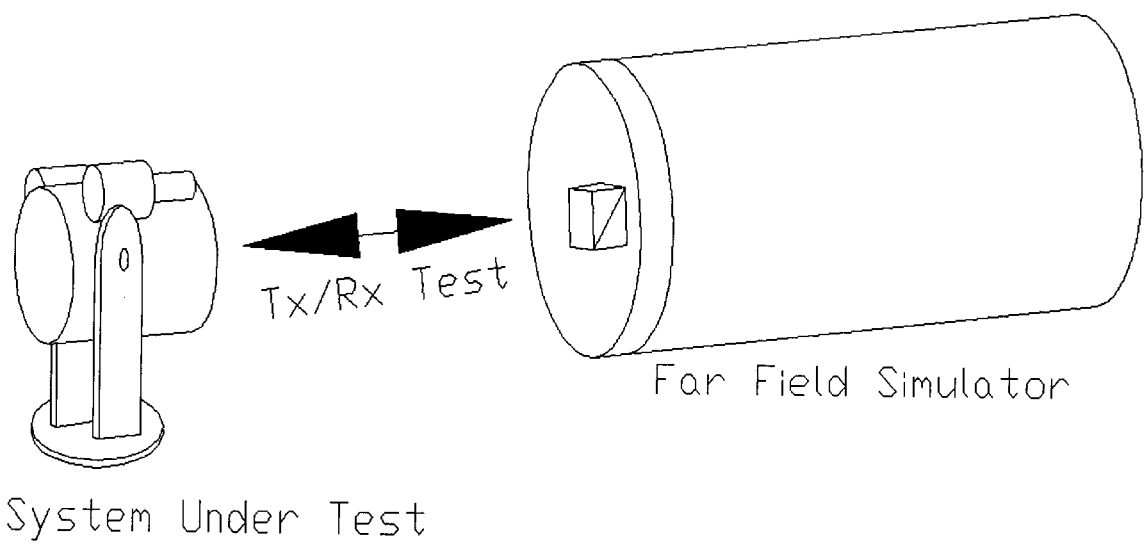
FIG. 3 shows a test set-up using the present invention.

A preferred embodiment of the present invention is shown in FIG. 1, 2 and 3. This embodiment utilizes an autostigmatic cube 3, two elements of which are at the focus of the FFS objective mirror 1. The objective mirror 1 consists of a 10-inch diameter, F/5.6 parabolic primary mirror. The primary mirror 1 in this embodiment is from a Discover model: 10-inch DHQ Dobsonian telescope. The mirror is mounted on an adjustable mount. The mount is fine adjustable in tip, tilt, and piston. The tip and tilt axes approximately coincide with the optical mirror surface and the piston movement is parallel to the optical z-axis, corresponding to the axial symmetry axis of the FFS primary mirror. Window 2 provides an optical flat reference surface along with protection from dust and other contaminants from reaching the inner optical surfaces of the FFS. Here window 2 is a 10"diameter round double surface flat (specified at lambda14) window as available from Custom Scientific Incorporated of Phoenix, AZ. This window along with mirror I defines the aperture of the FFS. The autostigmatic cube is the principal optical component of the Shack Interferometer described in literature (Shack, R.V., and Hopkins, G. W., Proceedings of the SPEE, vol. 126 (1977) pp. 134–142). Details of the autostigmatic cube 3 for this first preferred embodiment are shown in FIG. 2. Cube 3 includes a 2-inch cube beamsplitter (Melles Griot P/N 03-BSC-035), a plano-convex lens 3.1 (Melles Griot P/N LPX 225) cemented to the front surface of the cube formning a portion of a sphere 3.1. This portion of the sphere is referred to herein as a "reference sphere" with its center of curvature optically located at two points: (1) a point of an image plane shown at 3.2, and (2) a 5 micron diameter reference pinhole 3.3, both as shown in FIG. 2. This pinhole is an off-the-shelf pinhole available from Rolyn Optics Company of Covina, Calif. (P/N 70.1150). Both centers of curvature of reference sphere 3.1 are also optically located at the focus of the primary mirror 1 shown in FIG. 1 when mirror 1 is properly positioned. Note that in FIG. 1, the window 2 has one surface coplanar with the image plane 3.2 of the cube, however, the actual spatial relationship between these two planes along the FFS optical-z axis is arbitrary and generally determined by convenience in mounting the components.

This preferred embodiment includes optical elements shown in FIG. 2 used for both calibration of the FFS and testing of far field optical systems under test. The autostigmatic cube 3, reference sphere 3.1, image plane 3.2, microscope objective 3.4, filters and polarizers 3.5, imaging CCD 3.7 located at view plane 3.6, pinhole 3.3, coupling optics 3.9, and corresponding end of the optical fiber 3.10 are permanently fixed in relation to each other. The other end of the optical fiber 3.10 and its corresponding coupling optics 3.11 are also fixed in relation to each other. However, by virtue of the fiber's flexibility its other end and coupling optics 3.11 are free to be remotely positioned relative to the rest of the fixed assembly. The fiber may be of any reasonable length and thus the location of fiber end and coupling optics 3.11 is determined by convenience. These components are configured so that an FFS calibration source such as a mode stabalized HeNe 632.8 nm laser (Melles Griot P/N 05 STP 901) may be optically coupled into the system in two steps: (1) the calibration source is coupled into optical fiber 3.10 (3M P/N FS-SN-3224 630 nm single-mode fiber cable) with coupling optics 3.11 (Melles Griot P/N 01 LAT 011), and (2) the fiber 3.10 optically couples the self-test source to the cube 3 via coupling optics 3.9 (Melles Griot PIN 01 LAT 011) through pinhole 3.3. Once coupled into the FFS the FFS calibration source may be used for FFS calibration and FFS precision verification to be described later. Once proper FFS calibration and verification has been achieved mirror 1 will be positioned such that pinhole 3.3 is located at the precise focus of the primary mirror 1. The calibration source radiates through this pinhole. Because any source or detector can be coupled into the system through remotely placed coupling optics 3.11 without affecting the critical relationships of components: 3, 3.1, 3.2, 3.3, 3.4, 3.5, 3.6, 3.7, 3.9, and 3.10; interchange between sources and detectors at 3.11 perfectly maintains optimal optical alignment. Thus, these same components can be reused with the test-sources and test-detectors for evaluation of the far field system under test. In this embodiment microscopic objective 3.4 is a Melles Griot lens P/N 04 OAS 008, imaging CCD 3.7 is a Sony XC-999 CCD. Imaging components may also include filter and polarizing components 3.5 as indicated in FIG. 2. Preferably these components and the autostigmatic cube are mounted on a structure which positions the components as shown in FIG. 2. The structure is fixed to the FFS such that, during FFS calibration and precision verification, the primary mirror 1 fine adjustments can be used to move the primary mirror foci onto the reference sphere 3.1 centers of curvature such that the foci and the centers of curvature precisely coincide in 3D spatial location. During calibration of the FFS, the imaging microscope objective 3.4 is used to relay the image from the image plane 3.2 to a viewing plane 3.6 and CCD 3.7 with a magnification of the image. Indicated in FIG. 2 is the optical beam envelope 3.8 undergoing magnification by the microscope objective 3.4, while being relayed from image plane 3.2 to view plane 3.6. Polarization and intensity filters 3.5 are used to select and control the polarization state and brightness of the image at the view plane 3.6. Images in view plane 3.6 may be viewed using CCD camera 3.7 or other equipment and techniques well known to optical personnel. Optical test sources or test detectors may then replace the self-test HeNe source and be coupled into the system through coupling optics 3.11. A preferred test source is a 780 nm laser (Melles Griot P/N 56 ICS 006), and a preferred self-test source is a mode-stabilized helium-neon (HeNe) 632.8 nm red laser. A preferred test detector is a high-speed silicon avalanche photodiode (APD) (Hamamatsu P/N C5658). Preferred optical fiber 3.10 is 3M P/N FS-SN-3224 630 nm single-mode fiber cable. Both sets of coupling optics 3.9 and 3.11 are Melles Griot P/N 01 LAT 011.

Process for Calibrating and Self-Testing FFS

In situations where environmental conditions can be extremely varied such as on an airport tarmac where temperatures may range from −20to +120degrees Fahrenheit and in many other situations, it will be desirable to calibrate the FFS and confirm the precision of calibration prior to testing a long distance optical system. The FFS is preferably calibrated and self-verified using the following steps:

1) Adjust FFS components as shown in FIG. 2.
2) Couple self-test HeNe 632.8 nm mode-stabilized laser through coupling optics 3.11 and into the fiber 3.10, which is then coupled through coupling optics 3.9 to pinhole 3.3 as described above and indicated in FIG. 2. The light will diverge from the pinhole into the cube 3 and be reflected by the 45 degree angled beam splitter plane. The diverging light will proceed to the reference sphere surface 3.1. Since the light rays diverge from the pinhole located at the center of curvature of the reference sphere, they will be perpendicular to the spherical surface upon reaching it, such that, as the light encounters the reference sphere surface, a fraction will be reflected precisely back upon itself, with the remainder proceeding out toward the primary parabolic mirror 1 as shown in FIG. 1. The reflected portion of the laser light will retrace its path, converging to both the image plane 3.2 and pinhole 3.3. The light that converges to the image plane will form a stigmatic point image of the pinhole.

The light proceeding out of the cube 3 reflects off the parabolic primary mirror 1 and is collimated toward window 2 which as described is a precision reference flat at the FFS entrance aperture. Again, when the laser light reaches the reference flat each ray will be perpendicular to the flat surface at point of contact. A fraction will be reflected back in the direction from which it originated, and the remainder will transmit through the window 2, no longer of interest in the self-test. The reflected portion will retrace its path backwards through the FFS, reflecting from the primary parabolic mirror 1 and converging toward the cube 3, such that it will form another point image at the image plane 3.2 of the cube 3 as shown in FIG. 2.

3) Adjust polarizers, wave plates, and intensity filters 3.5 such that the image relayed to view plane 3.6 is at an appropriate intensity level for the imaging CCD 3.7

4) Rough adjust the FFS primary parabolic mirror 1 in FIG. 1 in tip, tilt, and piston, until the point image from the reference flat overlaps the point image from the cube reference sphere at the image plane 3.2, as viewed through the CCD 3.7 located at view plane 3.6. Adjust until the two points appear to be of identical size and location. The magnified image at view plane 3.6 of image plane 3.2 will now show interference fringes. 5) Fine adjust FFS primary mirror 1 in tip, tilt, and piston, to null interference fringes at the view plane 3.6 to complete confirmation of the calibration of the FFS. Perfect null of this fringe pattern indicates an optically perfect system.

Process for Using FFS on Multiple-Aperture Laser Communication Terminal Following the described calibration and precision verification, the FFS may be used to test far field optical devices. The following is an example of a procedure for testing a multi-aperture 780nm laser communication terminal:

1) Set up FFS such that equipment under test and FFS are aligned looking toward each other as shown in FIG. 3.

2) Roughly align the FFS such that all apertures and sub-apertures of the system under test point directly into the FFS aperture such that, if the distance between FFS and system under test as measured along the FFS optical-z axis were reduced to zero, apertures of the equipment under test would be entirely contained within the FFS aperture.

3) Couple a 780 nm test-source laser into the fiber 3.10 via coupling optics 3.11, replacing the self-test HeNe source.

4) Adjust Laser Communication Terminal orientation to maximize the Rx channel received 780 nm signal from FFS. This will align the axes of the Laser Communication optical Rx channel with the optical axis of the FFS such that they are pointing precisely at each other. As before, the autostigmatic cube will produce a perfect image of the 780 mn test laser source at the image plane 3.2 and view plane 3.6 of FIG. 2. When the Laser Communication Terminal is perfectly aligned with the FFS, the precise location of this image as seen on the image plane 3.2 and view plane 3.6 will represent the exact optical axis of the Laser Communication Terminal Rx channel. This location and the spot size is recorded using the CCD 3.7 at view plane 3.6. The recorded location of this image and the spot size then becomes the reference for correct bore sighting. 5) Replace the 780 nm laser source with a fiber-coupled high-speed detector (Hamamatsu P/N C5658) at coupling optics 3.11. 6) Turn on Laser Communication Terminal Tx channel transmitter lasers. The light from these will enter the FFS aperture and be imaged to the image plane 3.2, view plane 3.6, and pinhole 3.3 of FIG. 2. At the image plane 3.2 and view plane 3.6 the light from all Laser Communication Tx channels will center at the same location as the Rx channel, provided all channels are correctly bore sighted. Thus, any separation of image centroids at these planes will indicate misalignment of Laser Communication Tx channels. Furthermore, the size of each image at these planes is directly related to the divergence and beam size of the corresponding Laser Communication Tx channel. If desired, make adjustments to the Tx and/or the Rx channels and test again until proper operation of the transceiver is confirmed.

7) Send continuous laser power of a known level from the Laser Communication Tx channel and measure radiometric performance using the FFS fiber-coupled detector.

8) Send actual communication or pseudo-random bit stream signals through the Laser Communication Tx channel and detect them with the FFS using the fiber-coupled high-speed detector. This information can be used to determine bit error rate, modulation depth, etc.

Advantages

The present invention provides the following advantages over prior art optical testing devices:

1) Autostigmatic reference capability of the FFS anytime as opposed to calibration at manufacture with reliance on design to maintain calibration over time and operating extremes.
2) Reduced constraints on optical metering structure, making sensitivity to temperature, vibration, packing, shipping, etc. greatly reduced.
3) FFS can be calibrated at time of test so operation under ambient conditions can be verified.
4) FFS is less sensitive to shipping and handling.
5) Variable test sources and detectors with guaranteed and verifiable alignment accuracy.
6) Optical self-referencing capability at any time and with sub-wavelength precision.
7) Fiber optically coupled interchangeable sources or detectors enabling self-referenced Transmit (Tx) and Receive (Rx) testing from one setup.
8) Minimized central obscuration.
9) Enabled use of simple parabolic mirror primary (Newtonian configuration).
10) Use of electronic imaging of arbitrary precision at image plane.

Preferred Optical Components

Preferred optical components of a FFS built and utilized by Applicant are specified below:

Window Interface.

10" diameter lambda/4 round double surface flat by Custom Scientific.

Autostigmatic Cube preferably comprised of:

2" Beamsplitter Cube: Melles Griot P/N 03 BSC 035

Plano-convex Lens: Melles Griot P/N LPX 225

Optical Coupling into Fiber: Melles Griot P/N 01 LAT 011

Optical Fiber: 3M P/N FS-SN-3224 630 nm single-mode fiber cable

Input HeNe Laser Source for Self-Test: Melles Griot P/N 05 STP 901

Input 780 nm Laser Source for Test: Melles Griot P/N 56 ICS 006

Output APD Photodiode for Test: Hamamatsu P/N C5658
Filters, Polarizers, etc.: Elements for constraining polarization, wavelength, and radiometry.

Variable Neutral Density Filter: Melles Griot P/N 03 FDC 001

Linear Polarizer: Melles Griot P/N 03 FPG 007

Wave Plate(s): Melles Griot P/N 02 WRQ 011

Other Embodiments

The function of the autostigmatic cube can be achieved by any means that provides a reference surface (a spherical lens surface in the example of the first preferred embodiment) and a beamsplitter, such that the center of curvature of the reference surface is made to occur at two locations. The approach described in these embodiments uses as its objective a Newtonian telescope; however, many other designs may be used for the objective of the FFS. Such designs may be: reflective (catoptric), refractive (dioptric), or a combination (catadioptric). The design of the objective is general and can utilize any number of elements. The reference flat need not be a fixed part of the FFS, but can be a separate element. The reference flat need not cover the entire entrance aperture of the FFS but can be smaller or larger, depending on requirements of the component or system under test. The cube described is coupled through fiber optics, however, the design can be achieved by any form of optical coupling either into or out of the cube reference point at which the pinhole is located. The pinhole described is 5 microns in diameter, however, the actual size can vary and is, in general, determined by the desired resolution requirements. The pinhole on the cube can be a real surface or a relayed image of a hard stop. The choice of locations between pinhole and image plane as illustrated in FIG. 2 can be reversed. The plane illustrated for filters and polarizing components can alternatively or in combination occur between: cube and fiber, fiber and source, cube and imaging objective, imaging objective and imaging plane, cube and FFS objective. The example application describes calibrating the FFS by adjusting the primary mirror, however, calibrating adjustments can be accomplished by moving: primary mirror in tip, tilt and piston; cube in three-axis translation; or both. The first preferred embodiment describes a system for use with visible and near infrared test sources and detectors, however, the approach can be applied to systems using any optical wavelength from ultra violet to far infrared. Likewise, the self-test source used in the preferred embodiment is a mode-stabilized HeNe laser, however, the self-test capability can be performed with any optical source with appropriate coherence properties as to allow for measurable interference. The image in view plane 3.6 of FIG. 2 uses a CCD 3.7 (Sony XC-999), however, alternative approaches include the naked eye, film, electronic imagers, or any form of spatially discriminating sensor.

What is claimed is:

1. An autostigmatic far field simulator comprising:

A) an autostigmatic cube defining an image plane and comprising:
      1) a beam splitter,
      2) a pinhole,
      3) an optic defining a reference sphere having, by reason of said beam splitter, two optical centers of curvature; that are, a first optical center of curvature at said image plane and a second optical center of curvature at said pinhole, B) an adjustable objective mirror having by reason of said beam splitter, a first focus and a second focus and positioning elements for positioning said objective mirror such that said first focus of said objective mirror is located at said first optical center of curvature and said second focus is located at said second optical center of curvature, and C) an imaging objective for relaying a magnified image of said image plane to a view plane for viewing interference fringes.

2. A far field simulator as in claim 1 wherein said adjustable mirror objective is a parabolic mirror adjustable in tilt, tip and piston.

3. A far field simulator as in claim 1 wherein said optic defining a reference sphere comprises a plano-convex lens.

4. A far field simulator as in claim 3 wherein said beam splitter is a cube beam splitter and said lens is cemented to said cube beam splitter.

5. A far field simulator as in claim 2 and also comprising a window located at said image plane.

6. A far field simulator as in claim 5 wherein said window along with said adjustable objective mirror defines an aperture of said simulator.

7. A far field simulator as in claim 1 and further comprising a laser light calibration source and a means for focusing said calibration light source onto said pinhole.

8. A far field simulator as in claim 7 wherein said means for focusing comprises a fiber optic and a fiber coupling optics.

9. A far field simulator as in claim 7 wherein said means of fiber optic and a fiber coupling provide for easy interchanging of sources and detectors.

10. A far field simulator as in claim 1 and further comprising a light detector.

11. A far field simulator as in claim 1 and also comprising at least one optical filter and at least one polarizer to enhance viewing of said interference fringes at said image plane.

12. A far field simulator as in claim 1 wherein said imaging objective is a microscope objective and further comprising a CCD detector positioned at said view plane.

* * * * *